United States Patent [19]

Seachman

[11] Patent Number: 5,307,175
[45] Date of Patent: Apr. 26, 1994

[54] OPTICAL IMAGE DEFOCUS CORRECTION

[75] Inventor: Ned J. Seachman, Penfield, N.Y.

[73] Assignee: Xerox Corporation, Stamford, Conn.

[21] Appl. No.: 858,828

[22] Filed: Mar. 27, 1992

[51] Int. Cl.$^5$ ............................................. H04N 3/08
[52] U.S. Cl. ................................. 358/401; 348/349;
348/241
[58] Field of Search ................ 346/160; 358/227, 471,
358/447, 401, 497, 55, 209; 250/201; 355/228

[56] References Cited

U.S. PATENT DOCUMENTS

| | | |
|---|---|---|
| 4,287,536 | 9/1981 | Wiggins . |
| 4,295,167 | 10/1981 | Wiggins . |
| 4,446,548 | 5/1984 | Bouwhuis et al. . |
| 4,573,070 | 2/1986 | Cooper . |
| 4,613,986 | 9/1986 | Ataman et al. . |
| 4,660,082 | 4/1987 | Tomohisa et al. . |
| 4,661,852 | 4/1987 | Mourier ............................ 358/160 |
| 4,704,632 | 11/1987 | Van Den Heuvel . |
| 4,712,010 | 12/1987 | Alm . |
| 4,731,657 | 3/1988 | Miyagi ............................ 358/258 |
| 4,751,376 | 6/1988 | Sugiura ............................ 250/201 |
| 4,888,650 | 12/1989 | Abuyama . |
| 4,912,569 | 3/1990 | Petilli . |
| 4,918,543 | 4/1990 | Petilli . |
| 4,922,087 | 5/1990 | Nakajima ............................ 250/201 |
| 4,942,479 | 7/1990 | Kanno . |
| 4,987,450 | 1/1991 | Yamada ............................ 355/228 |
| 5,016,110 | 5/1991 | Vuichard ............................ 358/227 |
| 5,043,803 | 8/1991 | Asaida . |
| 5,107,337 | 4/1992 | Ueda ............................ 358/227 |
| 5,150,217 | 9/1992 | Senuma ............................ 358/227 |

FOREIGN PATENT DOCUMENTS 0439357 7/1991 European Pat. Off. .
WO89/11196 11/1989 PCT Int'l Appl. .

Primary Examiner—Mark R. Powell
Assistant Examiner—John Ning
Attorney, Agent, or Firm—Oliff & Berridge

[57] ABSTRACT

In an optical/electrical imaging system, optical depth of focus corrections are accomplished electronically. A plurality of defocus states of the optical system are measured and/or determined and image restoration coefficients corresponding to each of these states are stored. The state of defocus of the imaging system is then determined by deriving an image from a target having known characteristics, which are then correlated to determine a state of defocus. A microprocessor is utilized to provide appropriate defocus correction information to an electronic filter, thereby providing an adaptive filtering arrangement.

18 Claims, 8 Drawing Sheets

OPTICAL IMAGE DEFOCUS CORRECTION

BACKGROUND OF THE INVENTION

1. Field of the Invention

This invention relates to optical imaging systems in electronic reprographic equipment. More specifically, the invention relates to a system for correction of optical defocus and related optical system errors by correction of electrical signals representative of the optically produced image data.

2. Description of Related Developments

Electronic reprographic equipment and facsimile transmission equipment employ scanners for optically scanning an image, such as a document, and converting the optical information to an electrical image signal. Several types of optical systems are commonly employed to achieve the raster scanning of input documents and produce the representative electrical signal. FIG. 1 illustrates one of several configurations frequently used with reduction optical systems to scan a document and produce a reduced size image on a linear array of photosensors. This configuration is relatively tolerant of errors in the object conjugate of the lens; i.e., errors in the optical path length from the lens, through the mirrors, to the original document. Variations in this path length of ±1 millimeters, while causing noticeable change in magnification, will typically have little degrading effect on the focus, or sharpness, of the optical image formed on the photosensor array. Since only one compound lens is used, however, there may exist a variation in image quality along the linear portion of the image sensed by the photosensor array. Variations in image quality from the end of such a scanned image line to the center of this line frequently occur with a reasonable degree of symmetry about the center of the scanned image. These variations in quality may, for example, be caused by the curvature of the surface of best focus of the lens, or by other related lens aberrations which are well known to vary with the distance from the center of the optical field. The mathematical description of these aberrations can be approximately determined from lens design data, but further aberrations occur due to small errors which result from the lens fabrication process. Other single lens optical systems, such as those frequently referred to as "full-rate/-half-rate" scanners, have similar optical characteristics. As a result, scanners using single reduction lens optics may illustrate a decrease in image quality at the edges of the scan line, even when the center of scan is in good focus.

A second class of optical systems frequently used for document scanning in electronic reprographic equipment is the "full-width" scanner type, shown in FIG. 2. Here, an array of lenses extends (into the page in the figure) the full extent of the line on the input document which is to be imaged at unity magnification onto the full-width photosensor array. Full-width scanners have been developed which utilize amorphous or crystalline silicon photosensor arrays that offer the advantages of high responsivity (which yields high scanning speeds), low illumination requirements (which reduces power consumption) and compactness. These scanners require compact, full width lens arrays to achieve these performance advantages. The most commonly used lenses for this purpose are gradient index fiber lens arrays, as illustrated in FIG. 3. While commercially available gradient index lens arrays provide good optical efficiency and excellent control of the unity magnification requirement, they have poor depth-of-field capabilities when compared with, for example, reduction optics designs; i.e., they are considerably more sensitive to errors in the object conjugate length than reduction optics designs. Typically, the depth-of-field for high efficiency gradient index lens arrays is approximately ±0.25 to ±0.50 millimeters.

FIG. 4 illustrates the depth-of-field characteristics of a typical gradient index lens array. The graph of FIG. 4 plots the modulation transfer function (MTF) achievable by the lens array as a function of defocus distance at a predetermined spatial frequency; for example, FIG. 4 shows these characteristics for a commercially available lens at 6 cycles per mm. The MTF value correlates directly to the fidelity level of the image from the lens array. By selecting a desired level of MTF (and thus image fidelity) the curves show the defocus distances (or depth-of-field) of the lens array necessary to maintain the desired MTF. In FIG. 4, the zero on the abscissa represents the best focus position and the small divisions along the abscissa are tenths of a millimeter. Curve M represents the characteristics of the lens in the main scanning direction along a line coincident with the line of photosensors, and curve S represents the characteristics of the lens in the subscanning direction; i.e., perpendicular to the main scanning direction. From FIG. 4, it is evident that at high levels of image fidelity (MTF), small variations in defocus distance can cause unacceptable blurring and that the amount of blur varies with the scan direction (i.e., the lens becomes increasingly anamorphic in this loss of quality as the focus error increases). As a result, optics/sensor architectures employing such full-width lens arrays frequently do not provide sufficient image quality or resolution to meet image fidelity requirements, thereby limiting the use of such scanner designs.

SUMMARY OF THE INVENTION

An object of the invention is to provide a system for improving image fidelity in optical/electrical imaging systems.

It is an object of this invention to provide image defocus correction in systems using optics having a limited depth-of-field.

It is a further object of this invention to provide correction of other predictable optical errors which may occur in varying amounts throughout the field of the imaging system.

These objects are achieved in a system wherein the characteristics of the optical image data representative of a plurality of states of defocus or optical field position of the system are predetermined, and filter coefficients for the correction of these states are stored in the scanner system. The defocused or degraded state of a specific scanner system is then determined by use of one or more standard reference targets. Electrical image data from the photosensor array is then filtered with a fixed or time-varying image restoration filter which utilizes correction coefficients preselected to be appropriate for the state of system defocus or degradation previously determined.

DESCRIPTION OF PREFERRED EMBODIMENTS

Figure 1:
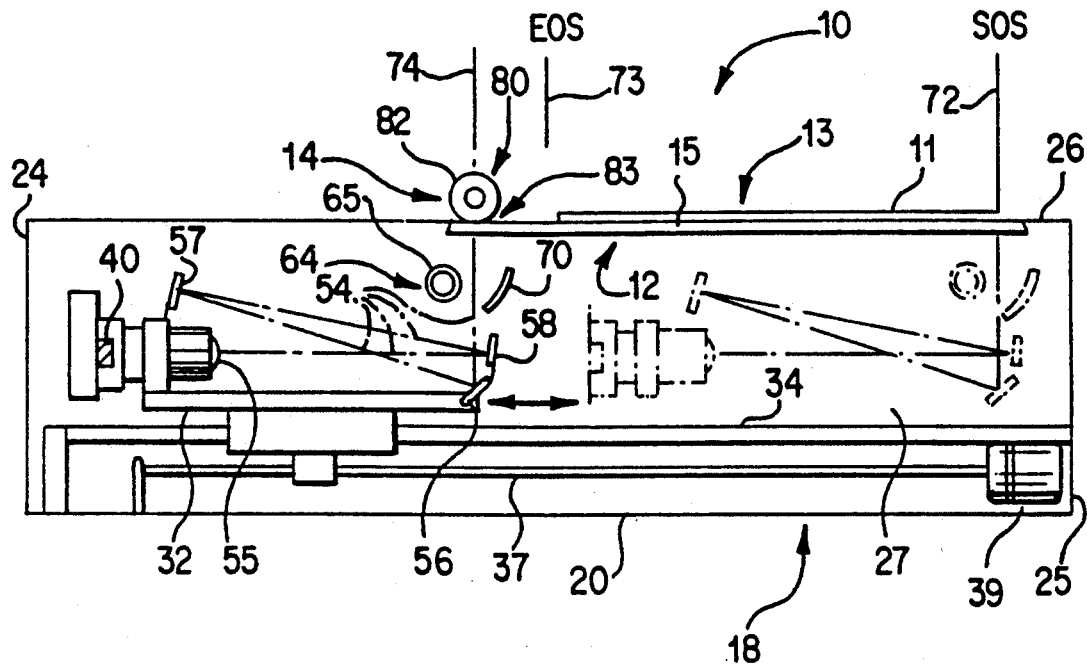
FIG. 1 is a schematic illustration of a reduction optical system employed in a document scanning system.

Referring to FIG. 1 of the drawings, there is shown an image input terminal, designated generally by the numeral 10, having a platen 12. The exemplary image input terminal 10 is a multi-mode, in this case, dual mode, input terminal which in a first mode scans a document original 11 resting face down on platen 12 line by line at a first scan station 13, and in a second mode scans a moving document at a second scan station 14. As will appear more fully herein, image input terminal 10 converts the document image being scanned to video image signals or pixels which are output to a suitable user (not shown) such as a memory, communication channel, raster output scanner, etc.

Image input terminal 10 has a suitable frame or housing 18 with base member 20, side members (not shown), end members 24, 25 and top member 26 which cooperate with platen 12 to provide an interior 27 within which a scan carriage 32 is movably disposed. Platen 12, which is made of a suitably transparent material, normally glass, is typically rectangular in shape with a length and width sized to accommodate the largest sized document to be scanned by input terminal 10 in the first mode plus the platen area necessary for the second mode.

For the first mode, scan carriage 32 is supported for back and forth or reciprocating scanning movement (in the direction shown by the solid line arrow of FIG. 1) within the interior 27 of image input terminal 10 by a pair of parallel carriage support rods 34. Support rods 34 are suitably mounted on frame 18 in predetermined spaced relation below platen 12 with carriage 32 supported for slidable movement on rods 34 by suitable bearings (not shown).

To impart controlled scanning movement to carriage 32, a drive screw 37 is threadedly engaged with carriage 32. A reversible drive motor 39 rotates screw 37 in either a clockwise or counter-clockwise direction to move the carriage 32 back and forth along carriage support rods 34.

A linear scanning or image reading photosensor array 40, which may, for example, comprise a Toshiba Model TCD141C CCD chip, is mounted on carriage 32. Array 40 has a series (i.e. 5,000) of individual photosensitive elements adapted to generate signals having a potential proportional to the reflectance of the object line viewed by the array 40. The signals output by array 40 are thereafter input to suitable signal processing circuitry (described below) to provide video image signals or pixels representative of the image scanned.

An optical system consisting of imaging lens 55 and folding mirrors 56, 57, 58 cooperate to form an optical imaging path 54 through which array 40 views platen 12 and a line-like portion of the document being scanned, the light rays reflected from the document line passing downwardly through platen 12 to mirror 56 and from mirror 56 through mirrors 57, 58 to lens 55 and array 40. To illuminate the document line being scanned, an illumination assembly 64 consisting of an elongated exposure lamp 65 and cooperating reflector 70 is provided on carriage 32 adjacent the underside of platen 12. Lamp 65 and reflector 70 extend in a direction generally perpendicular to the direction of scanning movement of scan carriage 32. As will be understood, reflector 70 serves to enhance and concentrate light emitted by lamp 65 onto platen 12 at the document line being scanned by array 40.

In the first scan mode, scan carriage 32 is moved by motor 34 from a Start of Scan (SOS) position 72 at one end of platen 12 to an End of Scan (EOS) position 73 and back to SOS position 72. Array 40, imaging lens 55, folding mirrors 56, 57, 58 and illumination sensor 64 are fixedly attached to scan carriage 32 and move in unison with the carriage 32. EOS position 73, which cooperates with SOS position 72 to delineate first scan station 13, is slightly upstream of the platen end to leave room for a second scan station 14. As will be understood, the distance between SOS and EOS positions 72, 73, respectively is chosen to accommodate the largest size document image to be scanned at first scan station 13.

In the second scan mode, scan carriage 32 is moved beyond EOS station 73 to a predetermined fixed scan position 74. During scanning in this mode, scan carriage 32 is stationary while the document being scanned is moved past the fixed scan position 74.

To move the document 11 to be scanned past the fixed scan position 74, a Constant Velocity Transport (CVT) 80 is provided. CVT 80 has a plurality of spaced document transport rolls 82 disposed opposite scan position 74, rolls 82 cooperating with the surface 15 of platen 12 opposite thereto to form a document feeding nip 83 therebetween.

Figure 2:
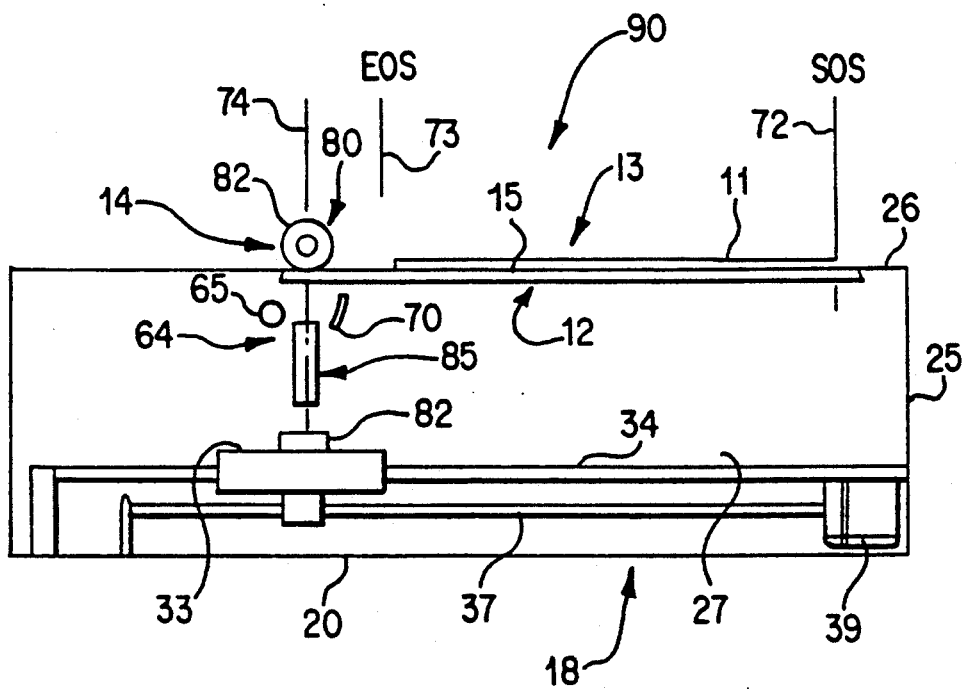
FIG. 2 is a schematic illustration of a unity magnification, full-width optical system employed in a document scanning system.

Referring to FIG. 2 of the drawings, there is shown an image input terminal, designated generally by the number 90, that employs a full width scanning arrangement. Elements of image input terminal 90 having a structure and function similar to like elements of the image input terminal shown in FIG. 1 are similarly numbered. The image input terminal 90 is also a multi-mode input terminal, which in a first mode scans a document original 11 resting face down on platen 12 line by line at a first scan station 13, and in a second mode scans a moving document at a second scan station 14. In the same fashion as imaging input terminal 10, imaging input terminal 90 converts the document image being scanned to video image signals or pixels which are output to a suitable user (not shown) such as a memory, communications channel, raster output scanner, etc.

Image input terminal 90 has a suitable frame or housing 18 with base member 20, end members 24, 25 and top member 26, which cooperate with the platen 12 to provide an interior 27 within which a scan carriage 33 is movably disposed. A document 11 placed on platen 12 is scanned in the same manner as described with respect to the FIG. 1 terminal. In the first or reciprocating scan mode, the controlled scanning movement is imparted to carriage 33 by drive screw 37 which is threadedly engaged with carriage 33. A reversible drive motor 39 rotates screw 37 in forward or reverse directions, thereby moving carriage 33 back and forth along carriage support rods 34.

In this scanner, the carriage 33 has mounted therein a photosensor array 82 that extends across the carriage 33 in a direction normal to the plane of the drawing. The width of the photosensor array 82 corresponds to the maximum width of the document to be imaged on platen 12. The illumination assembly 64 comprising the exposure lamp 65 and reflector 70 is mounted on carriage 33 by a suitable mounting arrangement (not shown). A gradient index lens array 85 is also mounted on carriage 33. The optical axis of the lens array 85 coincides with the optical axis between platen 12 and photosensor array 82, which in the FIG. 2 embodiment is substantially vertical. The gradient index lens array 85 extends transversely across the carriage 33 in a direction normal to the plane of the drawing. The width of the lens array 85 corresponds to the maximum width of the document to be scanned on platen 12 and thus generally corresponds to the width of photosensor array 82.

Alternatively, an image input terminal can include a two dimensional area array of individual photosensors. In such an array, the photosensitive elements can extend along one direction of the imaged portion of the platen 12, for example the width as in the FIG. 1 and FIG. 2 scanners, and also along all or a portion of the length of the imaged portion of the platen 12. In this manner, all or a significant portion of the area of a document can be electronically scanned.

Figure 3:
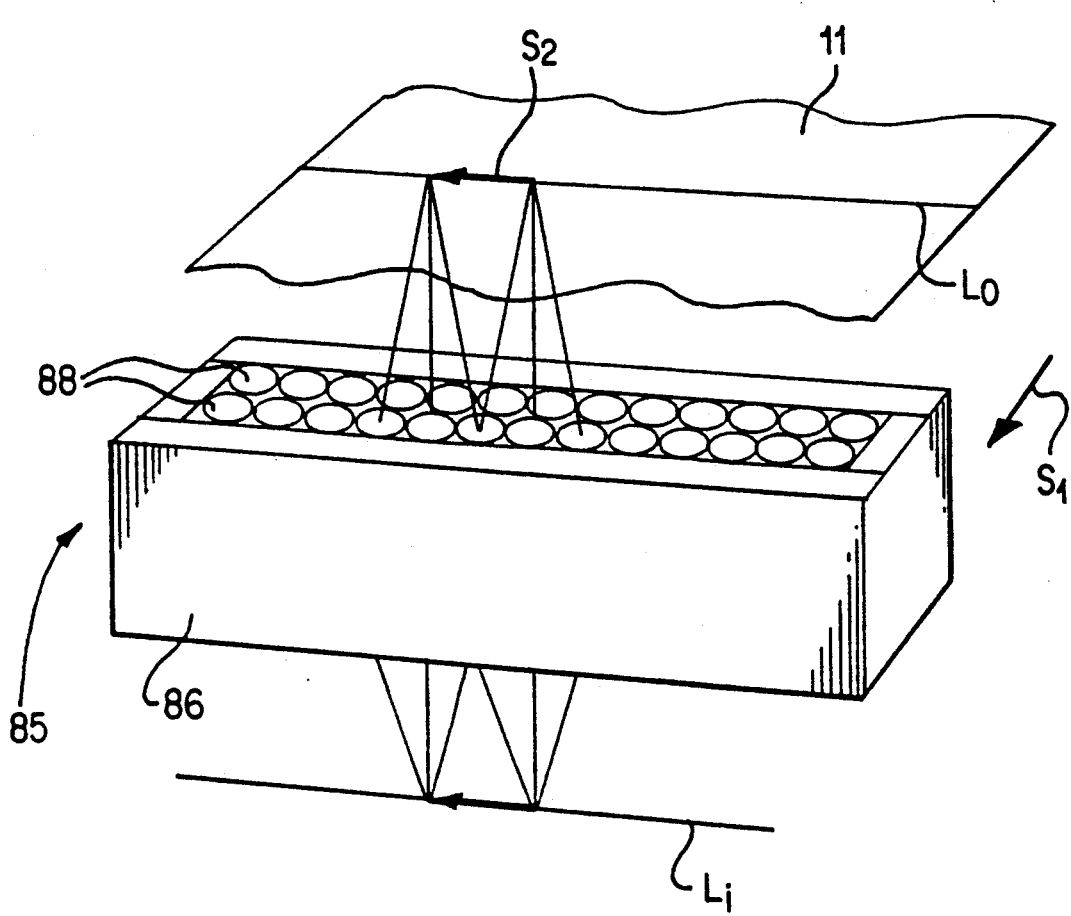
FIG. 3 is an illustration of a typical two-row gradient lens array designed for unity magnification.

Referring to FIG. 3, a typical scanning arrangement using the gradient index lens array 85 is schematically illustrated. Successive lines $L_0$ on the document 11 are scanned as the lens array 85 is moved in the direction of arrow S1, which comprises the subscanning direction. Line $L_0$ is scanned in a transverse direction of arrow S2 (main scanning direction) electronically by successive scanning of the photosensor array 82, which may, for example, comprise multiple CCD chips, each of which comprises a series of individual photosensitive elements adapted to generate signals having a potential proportional to the reflectance of the object line viewed by the array 82. As described previously, the signals output by array 82 are thereafter input to suitable signal processing circuitry (described below) to provide video image signals or pixels representative of the image scanned.

The gradient index lens array 85 can comprise, for example, two aligned series of gradient index glass fiber lenses 88. An example of such a lens array 85 is the type SLA09 lens sold under the tradename SELFOC by Nippon Sheet Glass. Successive lines $L_0$ are imaged through the lens array 85 to form image line $L_i$ on photosensor array 82. As shown in FIG. 3, optical image information from a given point (pixel location) on line $L_0$ may pass through one or more of the individual fiber lenses 88, to be imaged on the photosensor array 82.

Figure 5:
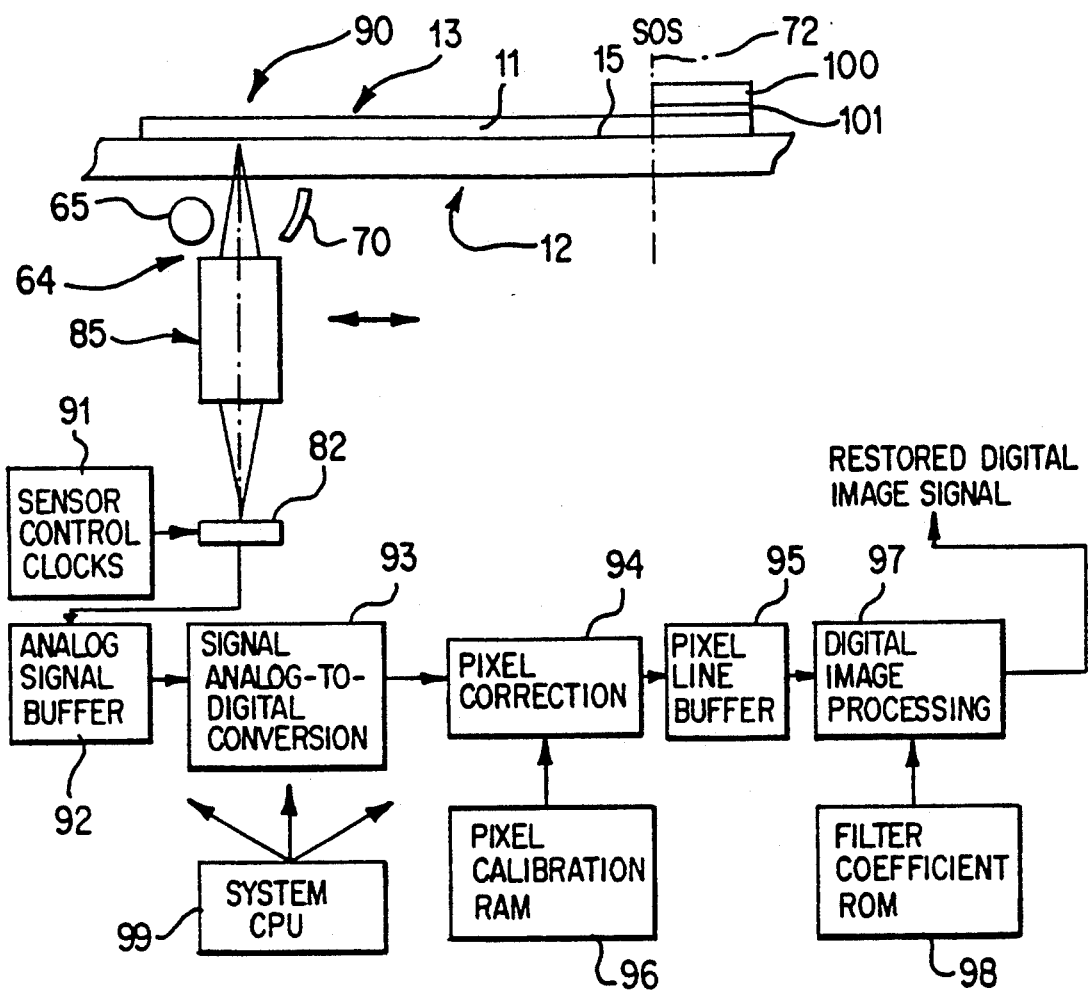
FIG. 5 is a schematic illustration of an image scanning system illustrating the circuit functions which may be employed to enable an embodiment of this invention.

Referring to FIG. 5, the basic functions of a typical electronic reprographic scanner capable of embodying the invention are illustrated. Raster scanning of document 11 on platen 12 occurs as a result of the electronic scanning of the linear photosensor array 82, combined with the mechanical motion of the lens 85 and sensor 82 in the subscanning direction. At each position in the subscanning direction, the output of the linear photosensor array 82 is an electronic image signal representative of the reflectance information along the single line on the document which lens 85 has imaged onto the sensor array 82. This signal thus represents the information in a row of picture elements, or pixels, which is sampled in the electronic or main scanning direction. The sampling pitch in this direction on the document 11 is frequently 300 to 600 samples per inch, as determined by the lens 85 magnification and the spacing of the individual sensors in the linear photosensor array 82. Mechanical motion of the sensor 82 and lens 85 in the subscanning direction permits a sequence of rows of pixels to be sensed, with the subscanning pitch or spacing determined by the distance the optical assembly has advanced from the beginning of one electronic line scan to the beginning of the next electronic line scan. This subscanning pitch, or separation between rows of pixels, is also typically in the range of 300 to 600 rows per inch, although it is not necessarily identical to the pixel pitch within one row.

Sensor control clocks 91 provide the necessary timing information to the photosensor array 82 to determine the rate at which pixels in a single row are clocked out into the analog signal buffer 92 and the time at which each line scan in the sequence of electronic line scans is to be initiated. The analog signal buffer 92 receives this sequence of pixels, one line at a time, and provides the necessary analog signal conditioning (such as signal gain and offset) to properly drive the analog-to-digital (A/D) converter stage 93. In the A/D converter 93, each analog pixel signal is converted into a digital value so that it may be subsequently stored and further processed by digital electronic methods. For example, analog pixel signals may be conditioned to vary from 0 volts (representing a point where the document reflectance was 0%) to a value of 1 volt (representing a point where a document reflectance of 95% was sensed). The A/D converter 93 will then convert this continuous analog voltage range into a discrete set of digital numbers. For example, if an 8-bit A/D converter is used, the signal is converted to one of the $2^8 = 256$ levels which can be represented by an 8-bit binary number. The signal, so represented, may be manipulated by conventional digital electronics.

It is also common practice to include pixel correction capability in the signal processing, as shown in FIG. 5. A linear photosensor array 82 frequently contains between 2000 and 9000 individual photosensor sites which sample the line of information on the document 11 in the electronic scan direction, as previously described. Because of small variations in size and other related parameters, each of these photosensor sites will vary slightly in its photoresponse and dark offset voltage. In high quality reprographic systems it is necessary to compensate for these variations to prevent image defects, such as streaks in the captured image. One technique for obtaining such a calibration utilizes a calibration strip 101 which is located on the platen 12 and outside the area to be occupied by the document 11 placed on the platen 12. A common position for calibration strip 101 is between the top of the platen surface 15 and the bottom surface of the document registration guide 100. The calibration strip 101 may consist of a uniform high-reflectance area approximately 6 to 10 mm wide and extending the full distance sensed by one line of the photosensor array 82, and an adjacent low-reflectance area of the same size, both are as facing into the scanner towards the lens 85. Under control of the system CPU 99, the lens 85 and photosensor array 82 are positioned so that the linear photosensor array 82 views only the uniform, high-reflectance area of this strip 101. The multiplicative factors required to adjust each pixel to a constant output voltage are computed and stored in the pixel calibration RAM 96, one factor for each sensor site in the photosensor array 82. The lens 85 and photosensor array 82 are next moved to a position which permits the photosensor array 82 to view the adjacent low-reflectance or black area of the calibration strip 101. Here an additive factor is computed for each pixel which will cause all pixels to produce the same output signal in the presence of little or no light. The additive correction factor for each of the individual sensor sites in the photosensor array 82 is also stored in the pixel correction RAM 96. During subsequent document scanning, as the signal from each pixel passes through the pixel correction circuit 94, the multiplicative and additive correction factors for the individual sensor element which sensed that pixel are read from the pixel calibration RAM 96 and applied to the current pixel signal. In this manner each pixel is corrected for the small deviations in gain and offset which result from the variation in characteristics of the individual sensor elements in the photosensor array 85. This calibration technique also compensates for variations in illumination along the photosensor array 82 caused by the lens 85 and lamp 65 characteristics.

Figure 6:
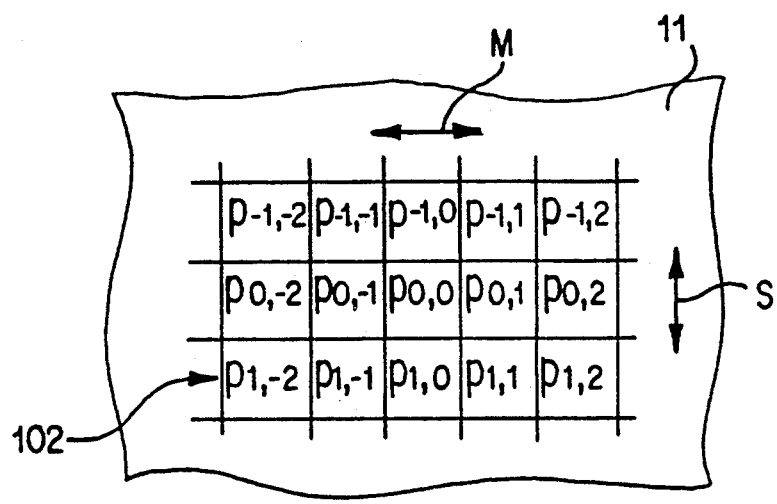
FIG. 6 is an illustration of a portion of the document to be scanned, demonstrating the pixel context used by the digital image processing filter.

Several scan lines of the corrected pixels are then stored in the pixel line buffer 95. This is required because subsequent image processing may utilize the signals from pixels which are adjacent to the currently processed pixel in both the main scanning and subscanning direction. Referring to FIG. 6, the pixel context 102 for image processing may be expressed in terms of the number of adjacent rows and the number of adjacent pixels in each row required to process the current pixel. For example, a 3×5 pixel context 102 implies that three adjacent scan lines (or pixel rows) with five pixels from each row are to be used for image processing. The position of the pixels may be labeled as shown in FIG. 6. The pixels are numbered with two indices. The first index represents the scan line position relative to the scan line of the current pixel. The second index represents the pixel position along the same scan line relative to the current pixel. If the pixel currently being processed is designated as $p_{0,0}$, then the pixel in the scan line directly above $p_{0,0}$ is $p_{-1,0}$; directly to the right is $p_{0,1}$, etc. When a new pixel is to be processed, the new pixel becomes $p_{0,0}$ and the 3×5 pixel context 102 shifts to the same relative position about the new pixel. In this example, it is clearly necessary to have pixel signal information available for 3 adjacent scan lines, and this information is stored in the pixel line buffer 95.

These multiple lines of pixel signal information are next made available to the digital image processing circuit 97. In this circuit, each pixel in the selected pixel context 102 is multiplied by a preselected coefficient stored in the filter coefficient read only memory (ROM) 98 and the resulting products are summed to produce a new value for the current pixel. This process is repeated for every pixel, with the selected set of coefficients applied to the new pixel and the surrounding pixels in the new pixel's context. For example, in the 3×5 context 102 previously cited, a set of 15 coefficients would be stored in the filter coefficient ROM 98. If these are labeled as

| $a_{-1,-2}$ | $a_{-1,-1}$ | $a_{-1,0}$ | $a_{-1,1}$ | $a_{-1,2}$ |
|---|---|---|---|---|
| $a_{0,-2}$ | $a_{0,-1}$ | $a_{0,0}$ | $a_{0,1}$ | $a_{0,2}$ |
| $a_{1,-2}$ | $a_{1,-1}$ | $a_{1,0}$ | $a_{1,1}$ | $a_{1,2}$ | to correspond with the associated pixel in the 3×5 context 102, the digital image processing circuit will convert the current pixel, $p_{0,0}$, to a new value, $p_{new}$, according to $$p_{new} = \sum_{j=-2}^{2} \sum_{i=-1}^{1} a_{i,j} p_{i,j}.$$

When the next pixel is to be processed, its new context may be similarly processed by this set of coefficients to generate a new value for this next pixel. Multiple coefficient sets may be maintained in the filter coefficient ROM 98, with each set preselected to process a specific type of image. One set may be preferable for continuous tone images, and another set for text images. The appropriate set of coefficients may be manually selected by the operator of the scanner, or may be automatically selected by a circuit (not shown) which recognizes a particular class of, images. The coefficient set which is applied to the current pixel may be changed very rapidly; i.e., it may be changed on a pixel-to-pixel basis, if there is a need to do so. It is understood that the System CPU 99 generally coordinates the circuits and activities described above, operating from computer code stored in its associated read only memory (not shown).

In order to improve the quality of the image data supplied by the photosensor array 82 in the presence of defocus errors introduced by lens 85, a three-step image restoration process is applied. The three steps are:

(1) Determine by measurement and/or computation the defocus imaging characteristics of the lens 85 at several levels of defocus throughout the expected range of focal errors, and compute appropriate image restoration filters for each level;

(2) Enable the image input terminal to dynamically measure its present state of defocus by scanning appropriately located focus measurement targets, thus establishing the level of defocus correction required to compensate for component and assembly errors; and (3) Using digital image processing circuits, select the set of image restoration filter coefficients indicated by the present state of defocus and apply these coefficients to the image signal.

This process will be described with reference to a full-width scanning system as shown in FIG. 2 which is assumed to have the functional capabilities of a scanner detailed in FIG. 5. The further applicability of this process to scanners of the single lens type as shown in FIG. 1 will be made apparent by subsequent descriptions.

In a first step, the defocus characteristics of lens 85 are measured and/or computed at several steps or levels of defocus throughout an expected range of focal errors for the purpose of determining appropriate image restoration filters for each step. In order to do so, a point spread or line spread function of the selected lens design is determined as a function of defocus error, typically at several steps over a range of 0–4 millimeters of defocus. The number of steps or levels within the expected range of defocus at which the point spread function is determined is dependent upon the type of lens 85, the anticipated assembly error for the scanner optical system, and the possible document position errors. Typically, the number of levels at which the point or line spread function would be determined is greater than 2 and less than 10.

Figure 4:
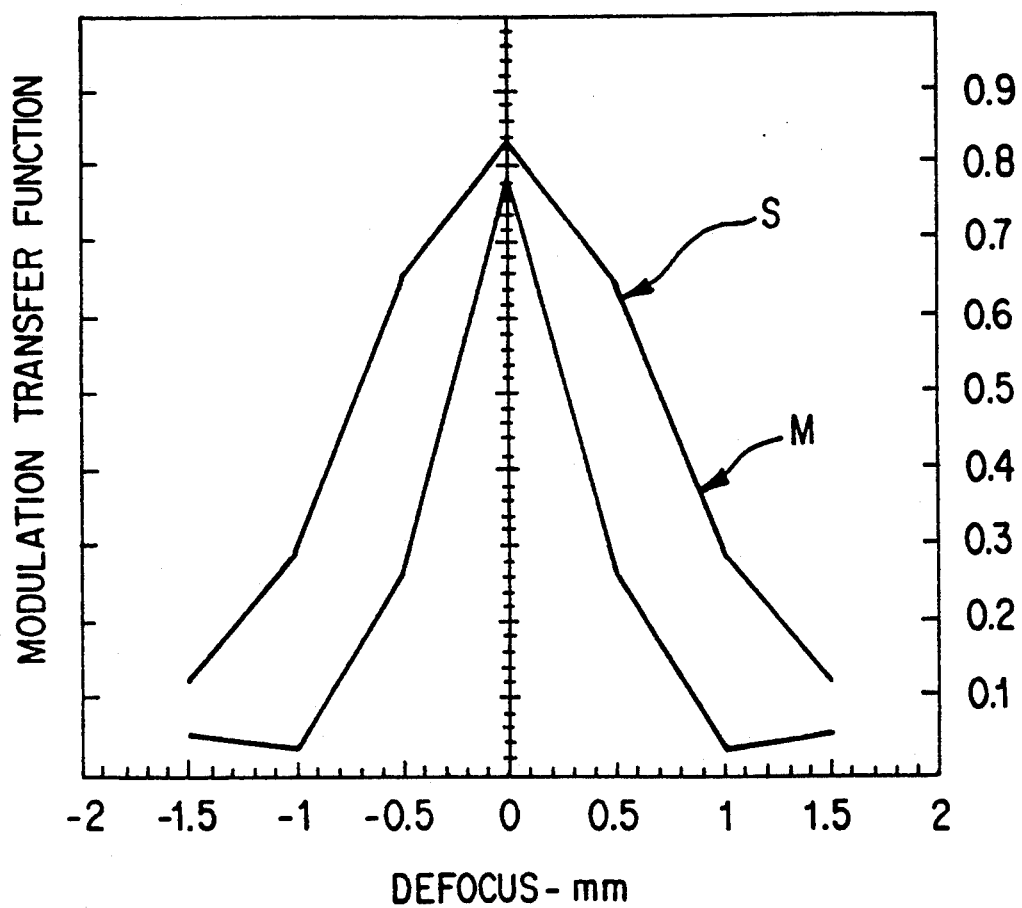
FIG. 4 is a graph showing modulation transfer functions of a typical index gradient lens array relative to defocus distance.
Figure 7:
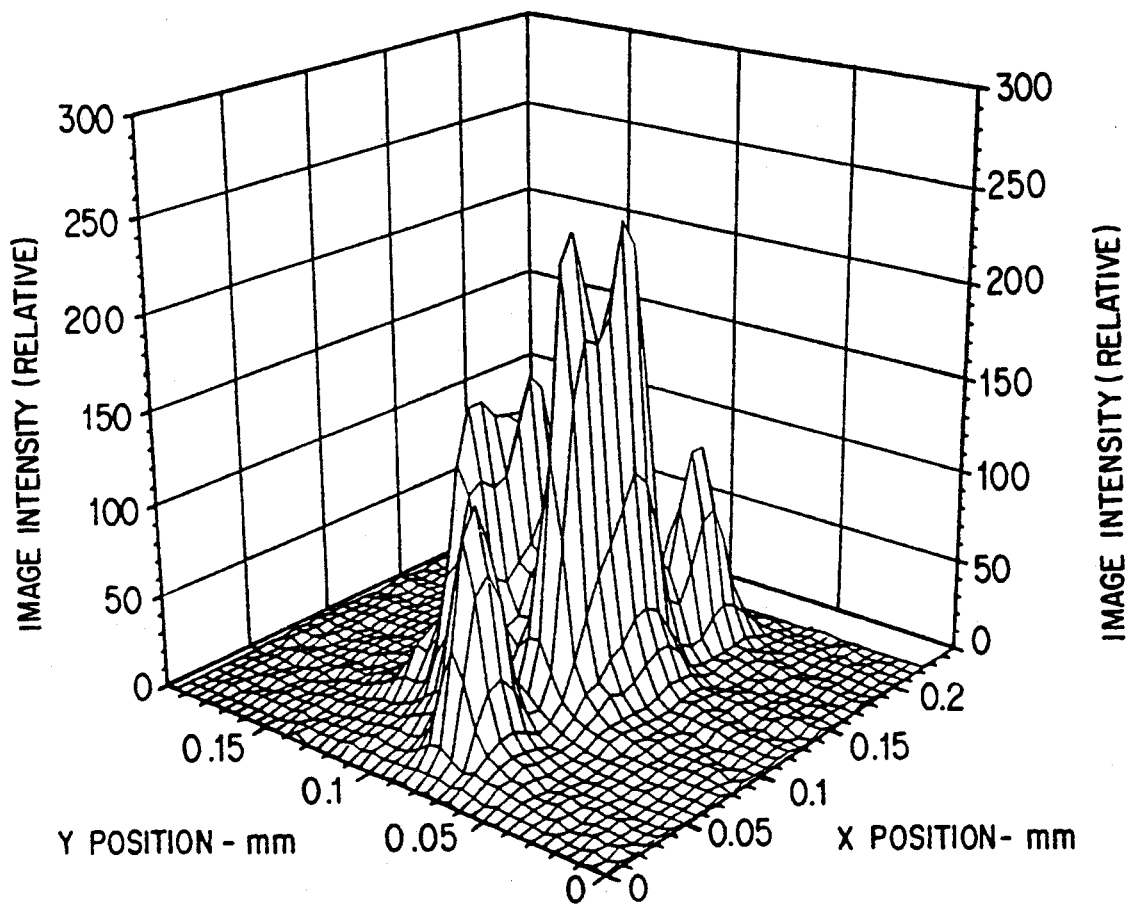
FIG. 7 is an illustration of the optical point spread function of a commercial gradient index lens array when a defocus error of 0.5 mm is introduced.

Because of the anamorphic nature of the lens array characteristics as previously described with reference to FIG. 4, it is preferable to characterize these lenses using the two-dimensional point spread function, thus capturing the image degrading characteristics for all directions on the document. Referring to FIG. 7, a typical point spread function is illustrated which was measured in green light for a Nippon Sheet Glass SLA09 lens array when a defocus error of 0.5 mm was introduced. This figure illustrates that a point of light on the document 11 is not imaged on the photosensor array 82 as a corresponding point, but has a defocused intensity distribution which blurs over an x-position range of approximately 0.15 mm and over a y-position of approximately 0.10 mm at the photosensor array 82. The multiple peaks in this point spread function are caused by the failure of the contributions from adjacent lenses in the array to converge to the same point in the defocused image plane. Point spread functions of the type shown in FIG. 7 are thus computed or measured and recorded at several defocus positions throughout the range of anticipated defocus errors. For example, they may be recorded for steps of 0.5, 1.0, 1.5, 2.0, 2.5, 3.0, 3.5 and 4.0 mm of defocus, producing a set of eight descriptions of the defocus blur. If the scanner operates in a color separation mode, it may also be necessary to capture this set of eight point spread functions in each of the illuminant colors, if the lens behavior changes significantly with the spectral properties of the illuminant. In this manner, the chromatic aberrations of lens 85 may be taken into account in determining the defocus characteristics of the optical system.

Figure 8:
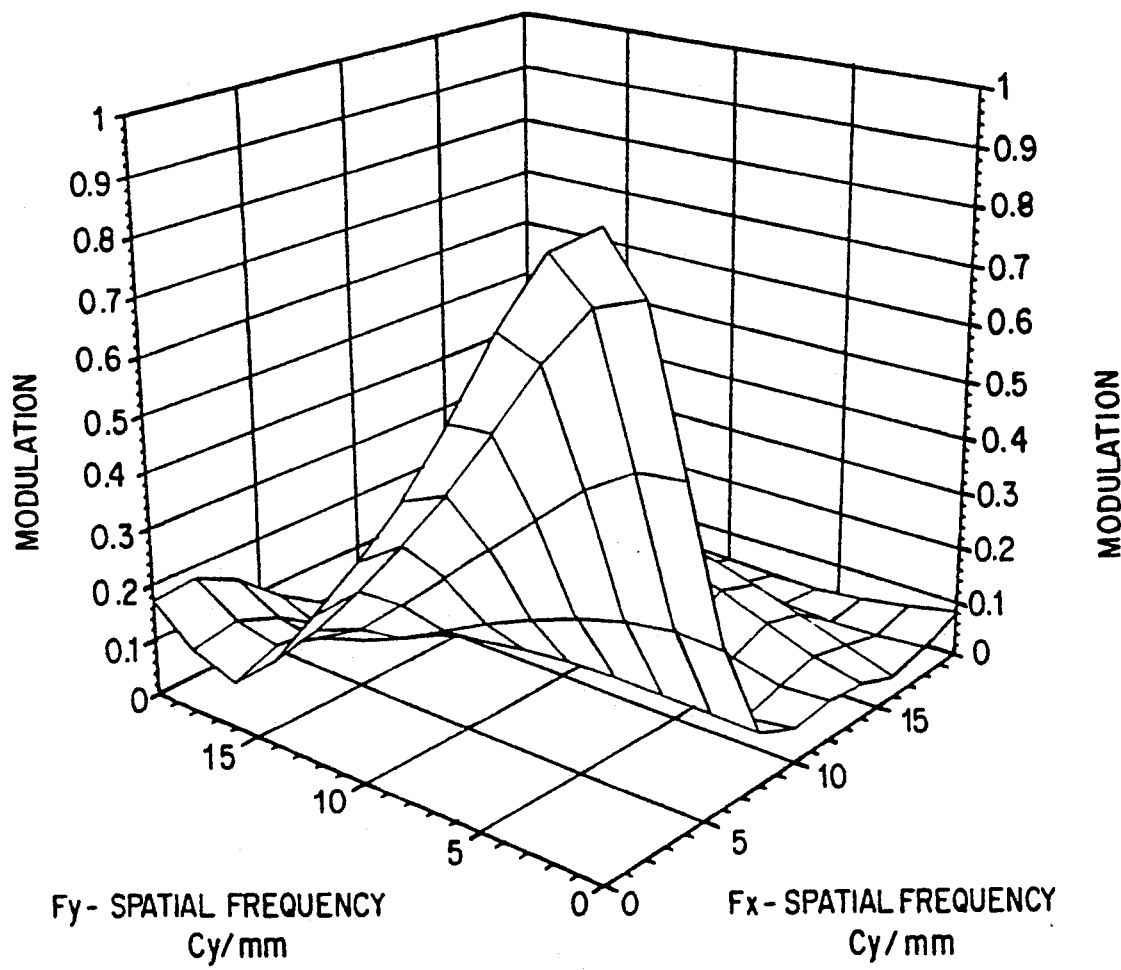
FIG. 8 is an illustration of the two-dimensional modulation transfer function derived from the point spread function illustrated in FIG. 7.

It is common practice, and useful in the design of digital filters, to describe each of the defocus point spread functions in a two-dimensional spatial frequency domain. This is achieved by computing the two-dimensional Fourier transform of the point spread function and normalizing the result at the zero-frequency origin to unity. This is a procedure well known in the fields of optical system analysis and digital filter design, and the resulting function is known as the two-dimensional modulation transfer function, or 2-D MTF. For example, FIG. 8 is a plot of the 2-D MTF so computed from the 0.5 mm defocus point spread function of FIG. 7. In this manner, each of the recorded point spread functions over the focal range is transformed to produce a corresponding set of 2-D MTF's.

In order to correct the undesirable blurring of the signal it is necessary to design a digital image restoration filter for each of the recorded blur functions, using the information computed in the set of 2-D MTF's above. One approach to the design of a compensating filter is to use the inverse filter. If the 2-D MTF surface for a particular blurred image condition, such as the shown in FIG. 8, is represented by the symbol, $H(f_x, f_y)$, then an inverse restoration filter may be computed from $$H_I(f_x, f_y) = \frac{1}{H(f_x, f_y)},$$

where $H_I(f_x, f_y)$ describes the frequency response of the filter in the two-dimensional spatial frequency domain, and $f_x$ and $f_y$ represent the frequency axis variables in the main and subscanning directions, respectively. Because the original blurred 2-D MTF, $H(f_x, f_y)$ may take on very small values, approaching zero, the computed inverse restoration filter frequency response, $H_I(f_x, f_y)$ may take on very high values (relative to unity) at the higher spatial frequencies. This leads to the significant enhancement of any noise in the originally captured image during the remainder of the restoration process which will be subsequently described. An alternate formulation for computing a desired restoration filter for the 2-D MTF function, $H(f_x, f_y)$ is the Wiener type filter expressed by $$H_W(f_x, f_y) = \frac{H(f_x, f_y)}{|H(f_x, f_y)|^2 + \frac{S_n(f_x, f_y)}{S_s(f_x, f_y)}},$$

where $H_W(f_x, f_y)$ describes the frequency response of the filter in the two-dimensional spatial frequency domain, $S_n(f_x, f_y)$ is the noise power spectrum and $S_s(f_x, f_y)$ is the signal power spectrum. A common variant on the Wiener formulation is to replace the ratio of power spectra in the denominator of the above equation with a single constant approximating the system's noise power-to-signal power ratio. The inverse and Wiener filter formulations are two of a variety of restoration filter formulations employed in digital filter designs. An aspect of this invention is that one of these generally known techniques is employed to compute the appropriate restoration filter frequency response for each of the recorded defocus blur responses; i.e., there is a specific restoration filter design for each step at which the blur response has been recorded. While the symbol $H(f_x, f_y)$ was used above to describe the 2-D MTF due to the blurring properties of lens 85 at each level of defocus, it should be clear that other predictable blurring errors, such as the blurring due to the finite size of the sampling aperture on each photosite of the photosensor array 82 may, optionally, be included in $H(f_x, f_y)$.

Figure 9:
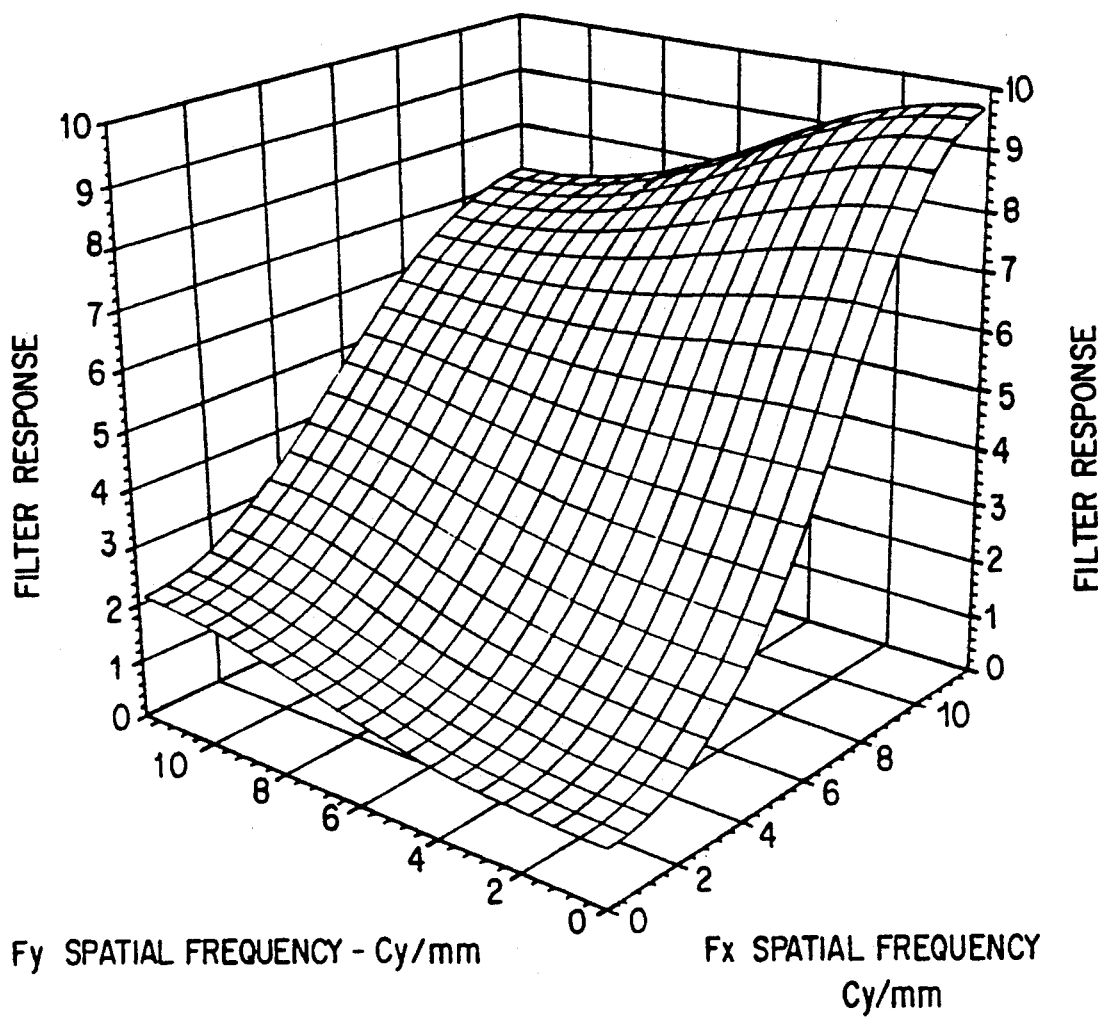
FIG. 9 is an illustration of the frequency response of an image restoration filter designed to remove the defocus blur of a commercial gradient index lens array having the characteristics shown in FIGS. 7

As a final part of the filter design process, the pixel coefficients, described previously as $a_{i,j}$, which are to be applied to the current pixel context are obtained from the computed restoration filter frequency response, typically by performing an inverse Fourier transform on the frequency response $H_W(f_x, f_y)$ or $H_I(f_x, f_y)$ of the restoration filter. While this theoretically leads to an infinite set of pixel coefficients, all but a few of the coefficients surrounding $a_{0,0}$ may be discarded while still maintaining a good approximation to the restoration properties of the computed restoration filter. As an example of this final operation, FIG. 9 illustrates a restoration filter frequency response, $H_I(f_x, f_y)$, which was computed using the inverse filter formulation, above, for the restoration of an image blurred according to the 0.5 mm defocus error illustrated by the $H(f_x, f_y)$ of FIG. 8. The inverse Fourier transform of the frequency response shown in FIG. 9, after dropping the less significant values, yields a set of coefficients, $a_{ij}$, which may be applied to the current pixel, as above described, to restore the blurred image to a quality approaching the original image. The resulting $a_{ij}$ for this example use a 5×5 pixel context, and are given by $$\begin{pmatrix} a_{-2,-2} & a_{-2,-1} & a_{-2,0} & a_{-2,1} & a_{-2,2} \\ a_{-1,-2} & a_{-1,-1} & a_{-1,0} & a_{-1,1} & a_{-1,2} \\ a_{0,-2} & a_{0,-1} & a_{0,0} & a_{0,1} & a_{0,2} \\ a_{1,-2} & a_{1,-1} & a_{1,0} & a_{1,1} & a_{1,2} \\ a_{2,-2} & a_{2,-1} & a_{2,0} & a_{2,1} & a_{2,2} \end{pmatrix} = \begin{pmatrix} -0.0014 & -0.0007 & 0.0501 & -0.0007 & -0.0014 \\ 0.0742 & -0.2281 & 0.0141 & -0.2331 & 0.0770 \\ 0.1222 & -1.7161 & 4.6879 & -1.7161 & 0.1222 \\ 0.0770 & -0.2331 & 0.0141 & -0.2281 & 0.0742 \\ -0.0014 & -0.0007 & 0.0501 & -0.0007 & -0.0014 \end{pmatrix}$$

In this manner, each of the recorded defocus levels for lens 85 has derived, according to known techniques, a corresponding set of restoration coefficients. The computation of these restoration coefficients completes the first step of the invention. These restoration coefficients are utilized to significantly reduce the detrimental effects of defocus blur and associated imaging errors on the digitally processed image signal.

In a second step, the actual state of focus of the optical system as mounted in a particular piece of equipment is determined. In order to dynamically measure the state of defocus in a specific scanner structure, a target is placed on the platen glass 12 or on some other convenient structure for establishing the level of defocus correction required to compensate for assembly and component errors existing in a specific assembly. The target may comprise an isolated line or a small multiple bar target of known modulation, having a spatial frequency sufficiently high so that it is sensitive to defocus errors. Ideally, the target should be located in a plane which is representative of the position (i.e., object conjugate), of the document or image to be scanned. For example, the target may be located in a region of the platen frequently used for calibration targets 101 or under a side registration strip, where it can be monitored periodically during the scanning process. The optical system, including the lens 85, the photosensor array 82 and the illuminator 64 are caused to be positioned under the known location of the focus measurement target under control of the system CPU 99. The image of the target is then projected onto the photosensor array 82, this image containing an amount of optical blur similar to that which will be experienced when document 11 is imaged. The digital signal from the photosensor array 82 may then be used, under control of system CPU 99, to compute the reduced modulation of the target, for example, by storing the maximum and minimum signal values obtained while scanning across the multiple bar target and computing modulation as the ratio of the difference of these maximum and minimum values to the sum of these maximum and minimum values. Since the blur characteristics of lens 85 have been previously determined and the focus target has a known spatial frequency and modulation, the reduction in modulation of this target can be correlated directly with one of the previously measured states of defocus. For this purpose a look-up table which identifies one of the previously measured states of defocus with the currently determined reduction in modulation of the focus measurement target is placed in a ROM (not shown) of the system CPU 99. In this manner, the specific state of defocus of the optical system comprising the platen glass 12, the lens 85 and the photosensor array 82 is determined, and this state may be directly identified with one of the previously evaluated levels of defocus and the associated digital filter coefficient set required to correct this defocus level.

The frequency at which a defocus determination is made is variable. For example, the target may be sensed once after final assembly and alignment, using a removable target on the platen, and the required level of defocus correction may be stored for the life of the machine. Alternatively, a target may be built into the machine and may be sensed during each machine warmup so that any changes in the optical components (for example, resulting from field replacements) can be compensated. Alternatively, the target may be sensed several times during the scan of a single image to correct for object conjugate variations during the scanning process. For color document scanners, the target may be sensed in each color to detect and correct for defocus resulting from chromatic differences in focus. In this manner, the restoration filter coefficient set used in the digital image processing circuit 97 can be modified for each color, thereby compensating for the chromatic aberrations of the lens 85.

In the final step, the restoration of the blurred image is undertaken in the digital image processing circuit 97 using filter coefficients stored in the filter coefficient ROM 98. Each of the image restoration coefficient sets determined for the multiple levels of possible optical defocus are stored in the filter coefficient ROM 98. This is preferably accomplished prior to the assembly of the image input terminal, but could be achieved subsequently by replacing the ROM chips with random access memory into which coefficients may be dynamically downloaded at any time. After the current state of defocus of the image input terminal is determined according to the previously described process, the system CPU 99 provides information to the digital image processing circuit 97 indicating which of the predetermined levels of defocus most accurately represents the current machine defocus state. The digital image processing circuit is thus enabled to read and apply to the pixel signal the set of image restoration filter coefficients most appropriate to the machine's current state of defocus.

While the automatic detection of focus state and subsequent selection of optimum restoration filter coefficients is the preferred operating mode, it may be desirable under certain circumstances to manually override this selection. For example, if a relatively noisy document is to be imaged, the automatically selected restoration filter may provide excessive enhancement of high frequency noise. In such cases it is desirable to permit the user to enter information on a user interface (not shown) which signals the system CPU 99 to substitute a user designated filter selection in place of the automatically sensed selection.

Figure 10:
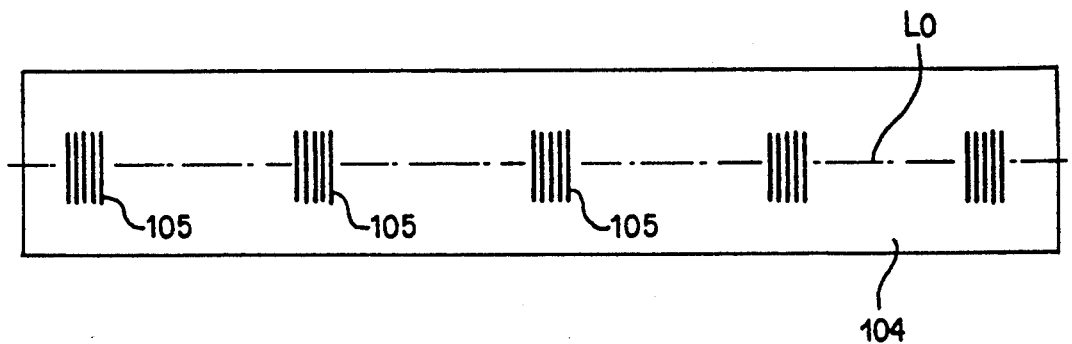
FIG. 10 is an illustration of a focus measurement strip containing multiple focus measurement targets.

In the foregoing description it has been assumed that a single defocus state can be detected and the appropriately selected single set of image restoration filter coefficients will be applied to all pixels in the scanned document's image signal. It is possible, however, that the state of focus may vary from one part of the document to another part. This may occur if the gradient index lens array 85 is not accurately parallel to the platen glass. It may also occur due to the natural increase in blur that can occur as the ends of a scan line are sensed with a single lens 55 as previously described in reference to the reduction optical architectures of FIG. 1. In these instances there may be several distinct states of defocus along the main scan line. Such multiple states of defocus along one scan line may be detected and corrected using a multiplicity of focus detection targets in a location which may be sensed by the scan line. Referring to FIG. 10, there is shown a strip of material 104 which may be, for example, mounted on the platen 12 with focus measurement targets 105 facing the full-width lens 85 or single lens 55. Mechanically placing the optical system such that a line in the main scanning direction senses targets 105 as indicated along line $L_0$, will permit the state of focus to be detected at multiple positions along a single scan line. Such multiple states are computed and communicated to the digital image processing circuit 97 prior to the start of the scanning of document 11. Thus during the scanning of document 11, the restoration filter coefficients appropriate to the current pixel's position along the scan line are correctly identified and applied. This approach to correction of multiple states of defocus within a document may similarly be extended to focus variations in the subscanning direction by mounting and sensing a multiple target strip of the type shown in FIG. 10 along the edge of a document which is perpendicular to the main scanning direction. In this latter arrangement it may be desirable to rotate the individual focus measurement targets 105 by 90°, or provide targets with 0° and 90° rotation to permit defocus measurement in both scanning directions.

From the foregoing, it can be seen that the depth of field of a scanner system can be electronically enhanced in an adaptive manner to maximize image reproduction fidelity. The system compensates for focus errors induced by optical component and alignment tolerances. The system permits relaxation of these tolerances while maintaining image quality.

While the invention has been described with reference to the structure disclosed, it is not confined to the details set forth, but is intended to cover such modifications or changes as may come within the scope of the following claims.

What is claimed is:

1. Image scanning apparatus comprising:
   an image support;
   a scanner for scanning an image on the image support, said scanner comprising an optical element for receiving optical image data from an image on the image support and a photoreceptor for receiving optical image data from the optical element and converting the optical data to an electrical data signal;
   restoring means for providing a plurality of sets of image restoration data, each set of image restoration data representative of a different one of a plurality of defocus states of the optical element throughout an expected range of focal errors;
   determining means for determining at least one defocus state of the scanner;
   selecting means for selecting at least one of the sets of image restoration data provided by the restoring means based on the at least one defocus state determined by the determining means;
   signal processing means for receiving the electrical data signal from the photoreceptor and the image restoration data from the selecting means and modifying the electrical data signal in accordance with the image restoration data received from the selecting means.

2. Apparatus as in claim 1, further comprising display means for displaying image data received from the processing means.

3. Apparatus as in claim 1, wherein the providing means comprises a memory for storing the plurality of sets of image restoration data.

4. Apparatus as in claim 1, wherein the providing means utilizes a Weiner filter to compute the image restoration data.

5. Apparatus as in claim 1, further including means for providing image quality data to the processing means indicative of the quality of an image on the image support.

6. Apparatus as in claim 5, wherein the means for providing image quality data comprises a manually selectable member.

7. Apparatus as in claim 1, further comprising a focus target and wherein the determining means determines one of a plurality of levels of defocus of the optical system formed by the image support and the scanner from image data from the focus target.

8. Apparatus as in claim 1, wherein the optical element is a lens.

9. Apparatus as in claim 1, wherein the optical element is an array of lenses.

10. Apparatus as in claim 1, wherein the optical element is a gradient index lens array.

11. Apparatus as in claim 1, wherein the photoreceptor comprises a linear array of photosensitive elements.

12. Apparatus as in claim 1, wherein the photoreceptor comprises an area array of photosensitive elements.

13. A method for correcting defocus of an image scanner having an optical element for providing optical image information to a photoreceptor comprising the steps of:
   determining the focus characteristics of the optical element at a plurality of levels of defocus throughout an expected range of focal errors;
   converting the defocus characteristics of the optical element at each defocus level to a set of correction data and electronically providing the correction data;
   determining at least one defocus level of the scanner;
   selecting at least one set of correction data corresponding to the at least one defocus level determined in the defocus level determination step; and
   electronically correcting an electrical image signal from the photoreceptor in accordance with the correction data selected in the selecting step.

14. A method as in claim 13, wherein the defocus level determining step comprises scanning a predetermined image and determining the defocus level from electrical image data representative of the predetermined image.

15. A method as in claim 13, wherein the step of determining the defocus characteristics of the optical element comprises determining the defocus characteristics for light at a plurality of different wavelengths and the step of determining the defocus level of the scanner includes determining the wavelength of light received by the optical element when the defocus level determination is made.

16. A method as in claim 13, wherein the step of electronically correcting the electrical image signal comprises filtering the signal.

17. A method as in claim 16, wherein the step of filtering the electrical image signal comprises determining filtering characteristics on the basis of at least one of the provided sets of correction data and the level of defocus determined in the defocus level determining step.

18. A method as in claim 13, wherein the step of electronically providing the correction data comprises storing the correction data in a memory.

* * * * *